US006390721B1

(12) United States Patent
Wilson, II et al.

(10) Patent No.: US 6,390,721 B1
(45) Date of Patent: May 21, 2002

(54) MULTI-MOUNT CLAMP FOR A STRUCTURAL MEMBER

(75) Inventors: James D. Wilson, II, Collinsville; Kevin W. Kuester, Freeburg, both of IL (US)

(73) Assignee: Marconi Data System, Inc., Wood Dale, IL (US)

( * ) Notice: Subject to any disclaimer, the term of this patent is extended or adjusted under 35 U.S.C. 154(b) by 0 days.

(21) Appl. No.: 09/466,158

(22) Filed: Dec. 18, 1999

(51) Int. Cl.[7] .................................................. F16B 2/02
(52) U.S. Cl. ........................ 403/312; 403/234; 403/400
(58) Field of Search ........................... 403/344, 49, 195, 403/196, 234, 236, 289, 309, 312, 374.3, 386, 395, 399, 400

(56) References Cited

U.S. PATENT DOCUMENTS

| 1,316,289 A | * | 9/1919 | Eubank ....................... 403/375 |
| 1,797,904 A | * | 3/1931 | Dibner ........................ 403/312 |
| 3,310,264 A | | 3/1967 | Appleton ..................... 248/72 |
| 3,454,305 A | * | 7/1969 | Gilmour, Jr. .................... 301/1 |
| 4,311,407 A | | 1/1982 | Doyle |
| 4,475,843 A | * | 10/1984 | Wyler .................... 403/399 X |
| 4,483,334 A | * | 11/1984 | Murray ....................... 403/400 |
| 4,500,077 A | | 2/1985 | Coxon |
| 4,536,102 A | | 8/1985 | Doyle |
| 4,557,447 A | | 12/1985 | Combe |
| 4,637,496 A | * | 1/1987 | Atkey et al. ............. 403/309 X |
| 5,058,870 A | | 10/1991 | Cetnar |
| 5,067,845 A | | 11/1991 | Schlueter .................... 403/344 |
| 5,465,932 A | * | 11/1995 | Richter .................... 403/236 X |
| 5,609,436 A | * | 3/1997 | Jou ............................. 403/400 |
| 5,779,387 A | * | 7/1998 | Schonauer .................. 403/400 |
| 5,797,697 A | | 8/1998 | Keller ......................... 403/384 |
| 5,921,520 A | | 7/1999 | Wisniewski ............. 248/316.1 |

FOREIGN PATENT DOCUMENTS

GB    1590713    6/1981

* cited by examiner

Primary Examiner—Lynne H. Browne
Assistant Examiner—David E. Bochna
(74) Attorney, Agent, or Firm—Polster, Lieder, Woodruff & Lucchesi

(57) ABSTRACT

A one-piece, unitary clamp for a longitudinally extending structural member, such as a tube, is provided which can be mounted to a mounting surface such that the structural member received in the clamp is either parallel to or perpendicular to the mounting surface. Additionally, two clamps of the present invention can be fastened together to form a cross-over clamp, a T-clamp, or another compound clamp which will hold two structural members together in a desired relationship. The clamping arms of the clamp have an elastic hinge which allows an upper portion of the clamping arm to move relative to a lower portion of the clamping arm when the clamp is tightened. Additionally, when the clamp is loosened, the elastic hinge of the clamping arms cause the clamping arms to pull away from the structural member received in the clamp to fully release the grip of the clamp on the structural member.

18 Claims, 6 Drawing Sheets

MULTI-MOUNT CLAMP FOR A STRUCTURAL MEMBER

CROSS-REFERENCE TO RELATED APPLICATIONS

Not Applicable

STATEMENT REGARDING FEDERALLY SPONSORED RESEARCH OR DEVELOPMENT

Not Applicable.

BACKGROUND OF THE INVENTION

This application relates to clamps which hold structural members such as tubes, and in particular to a clamp which can mount structural members to a surface either parallel to, or normal to, the surface, and which can be used to secure two structural members together in a cross-over relationship, T-shaped relationship, and various other desired relationships.

Tube clamps are well known, and are used in many industries to mount structural members, such as tubes, pipes, etc., to a surface and to hold two members together. The assignee of the current invention currently uses clamps in printing processes to support printheads in a desired relationship relative to, for example, boxes which are printed upon. Clamps are used for perpendicular mounts (mounting a structural member to extend from a surface), parallel mounts (mounting a structural member to be parallel to a surface), and crossover mounts (holding two structural members 90° relative to each other). Currently, a different clamp is used for each of the three types of mounts. As can be appreciated, the requirement for three different clamps can create inventory problems and can increase inventory or part costs.

The clamping portion of a prior art clamp C currently used is shown in FIG. 10 as part of a parallel mount clamp. An example of a prior art cross-over clamp CC and the parallel mount clamp PC is shown in FIG. 11 to suspend a printhead or other device D at a desired location. These prior art clamps C, CC, and PC are primarily intended for erecting permanent structures, such as hand railings, supports, cages, ctc. The manufacturers of these types of clamps have developed a broad line of clamps that do a single function (clamp or rigidly hold one or more pieces of tubing in a fixed location). However, these clamps deform when clamped over long periods of time or in environments where the clamps are repeatedly loosened and re-tightened to permit repositioning of the structural members.

The prior art clamp C includes a pair of curved fingers which wrap around the tube or structural member to be clamped. A screw passes through the tops of the fingers to draw the fingers together to frictionally hold the structural member in place. The existing clamps deform around the structural member after the first use. When the tightening screw is loosened, the clamps do not fully return to a pre-clamping state and thus frequently do not completely release the structural member. Thus, the clamp partially retains its grip on the structural member, and the structural member will not slide freely in the clamp after the clamp has been loosened. To alter the position of the structural member relative to the clamp, a typical user must pry open the clamp with a screwdriver or must use a hammer to force the tubing to its new position. The force which must be used to adjust the position of the tubing is a problem when sensitive equipment, such as, capillary fed printheads, are supported on the tubing. The force required to move the tubing can cause the printhead to deprime. This is a great inconvenience to the end user. As can be appreciated, such force can detrimentally affect other types of sensitive equipment which may be mounted to the structural members.

When adjusting the position of the tubing, the rotational position of the tubing must be able to be controlled, so that, for example, a large container of ink is not spilled when the clamp is loosened to adjust the tubing position. The current clamps do not allow for this. Thus, adjusting the position of the tubing, to adjust the axial or radial position of the print head or ink system mounted on the structural member can be very difficult.

BRIEF SUMMARY OF THE INVENTION

Briefly stated, a one-piece, unitary clamp is provided which can be mounted to a mounting surface such that a longitudinally extending structural member, for example, a tube, received in the clamp is either generally parallel to or generally perpendicular to the mounting surface. Additionally, two clamps of the present invention can be fastened together to hold two longitudinally extending structural members together in a cross-over relationship, a T-shaped relationship, or other desired relationships.

The clamp includes a base and a pair of spaced apart clamping arms extending from the base. The clamping arms define a channel sized to slidingly receive the structural member. The inner surface of the arms (which defines the channel) can be configured so that the clamp can accept structural members which, in cross-section are round, square, or any other desired polygonal shape. Exemplarily, the channel includes spaced apart cutouts which, in this instance, accept the corners of the square tubing stock. A tightener cooperates with the clamping arms to draw the clamping arms together so that the clamping arms will frictionally grip the structural member to substantially prevent movement thereof relative to the clamping arms when the tightener is tightened.

A first opening (which is preferably formed as a slot) is formed in the base. A first fastener can be extended through this first opening so that the base can be mounted to a mounting surface such that the axis of the channel is generally parallel to the mounting surface. The clamp also includes a passage which extends generally parallel to the clamping arms. The passage receives a second fastener which extends through the passage to mount the clamp to the mounting surface such that the channel's axis is generally perpendicular to the mounting surface. The clamp includes a body or sleeve which is formed extending from the mounting arms. Preferably, the body or sleeve is formed integrally with the mounting arms. The passage for the second fastener is formed in this body. A second opening is formed in the clamp base. The second opening is positioned, such that when the base of a first clamp is placed adjacent the base of a second clamp, the first opening of the first clamp will be aligned with the second opening of the second clamp. The two clamps can then be connected together with a fastener. The relative position of the second hole to the first hole is such that when the two clamps are joined together, the axes of the channels of the respective clamps will be angled relative to each other. Preferably, the axes of the two channels are offset from each other by about 90°.

The sleeves through which the second fasteners extend divide the clamping arms into two portions: a lower portion and an upper portion. The passages formed in the sleeves open up into the channel which receives the structural member to be clamped. The sleeves defining the passages form an integral hinge joining the upper and lower portions of the clamping arms such that, when the tightener is tightened, the clamping arm upper portions move relative to the clamping arm lower portions. The hinge is an elastic hinge and, upon loosening of the tightener, the clamping arms will elastically spring away from the structural member clamped in the clamp to allow the structural member to be repositioned relative to the clamp, or removed from the clamp.

The clamp is preferably made of a material which has a memory. Thus, when the tightener is loosened, the clamping arms will pull away from a structural member received in the channel so that the structural member will slide freely in said channel. This will further facilitate easy repositioning of the structural member relative to the clamp should repositioning ever be necessary.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes what we presently believe to be the best mode of carrying out the invention.

Figure 7:
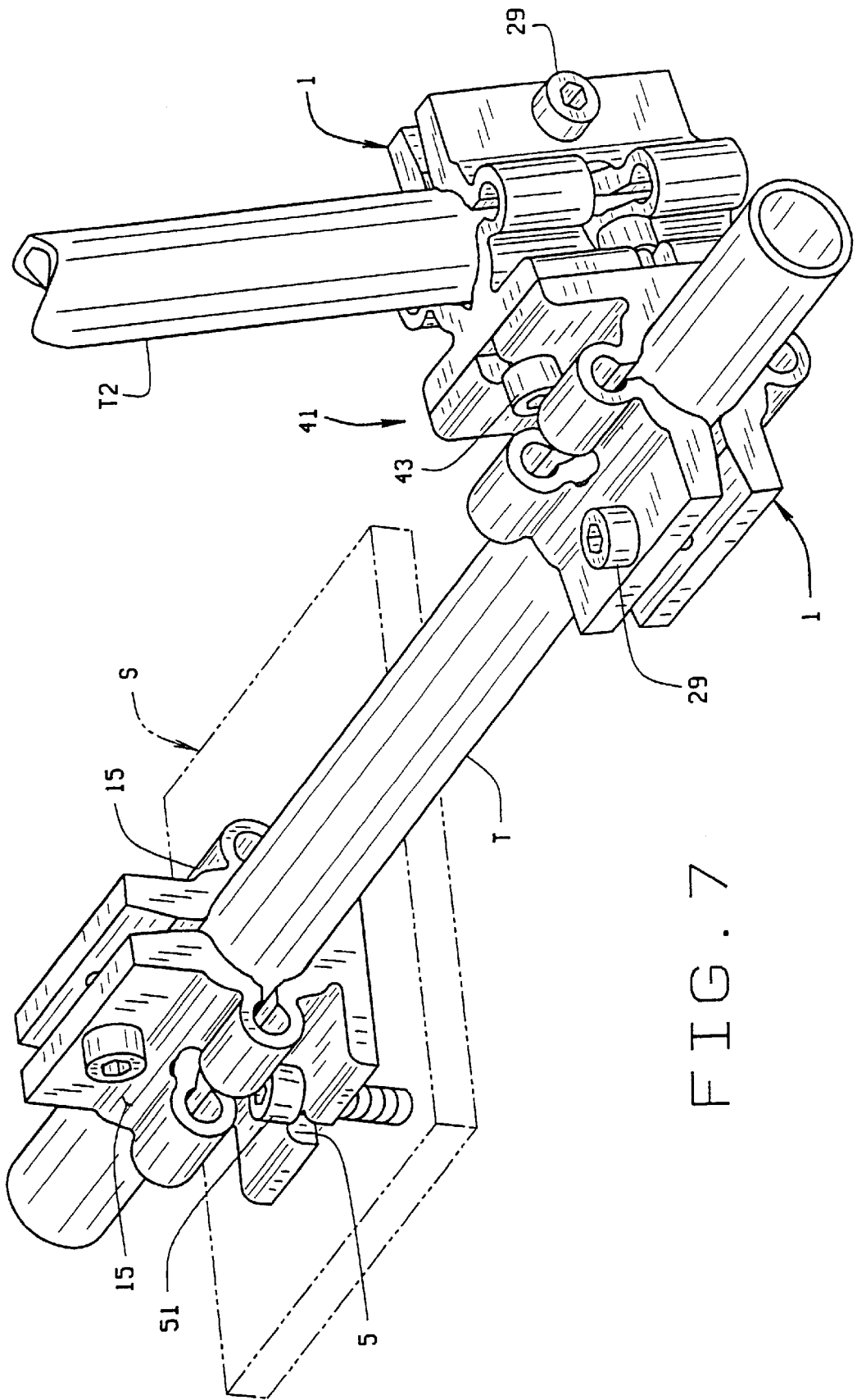
FIG. 7 is a perspective view showing a clamp being used to mount a structural member parallel to a surface and a pair of clamps mounting two structural members in a cross-over relationship.
Figure 8:
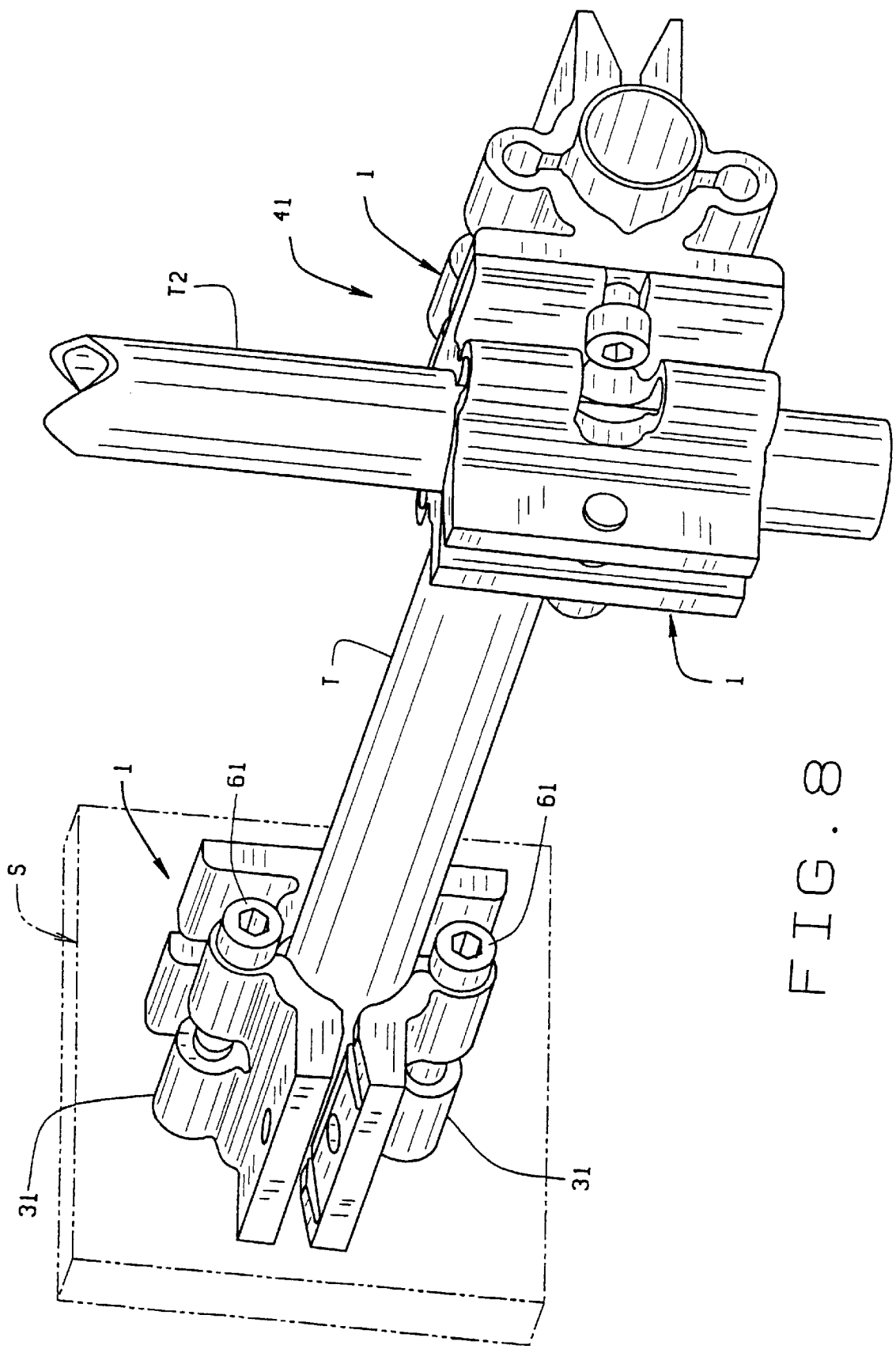
FIG. 8 is a perspective view showing a clamp being used to mount a structural member perpendicular to a surface and a pair of clamps mounting two structural members in a cross-over relationship.
Figure 10:
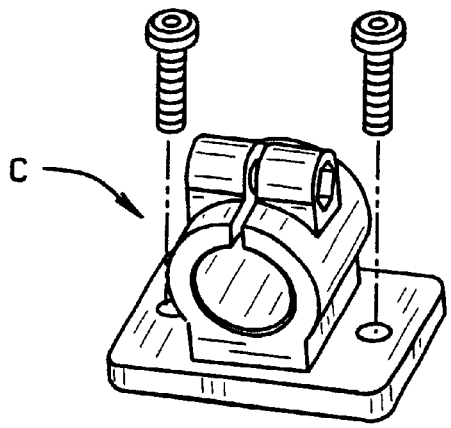
FIG. 10 is a perspective view of a prior art parallel mount clamp.
Figure 11:
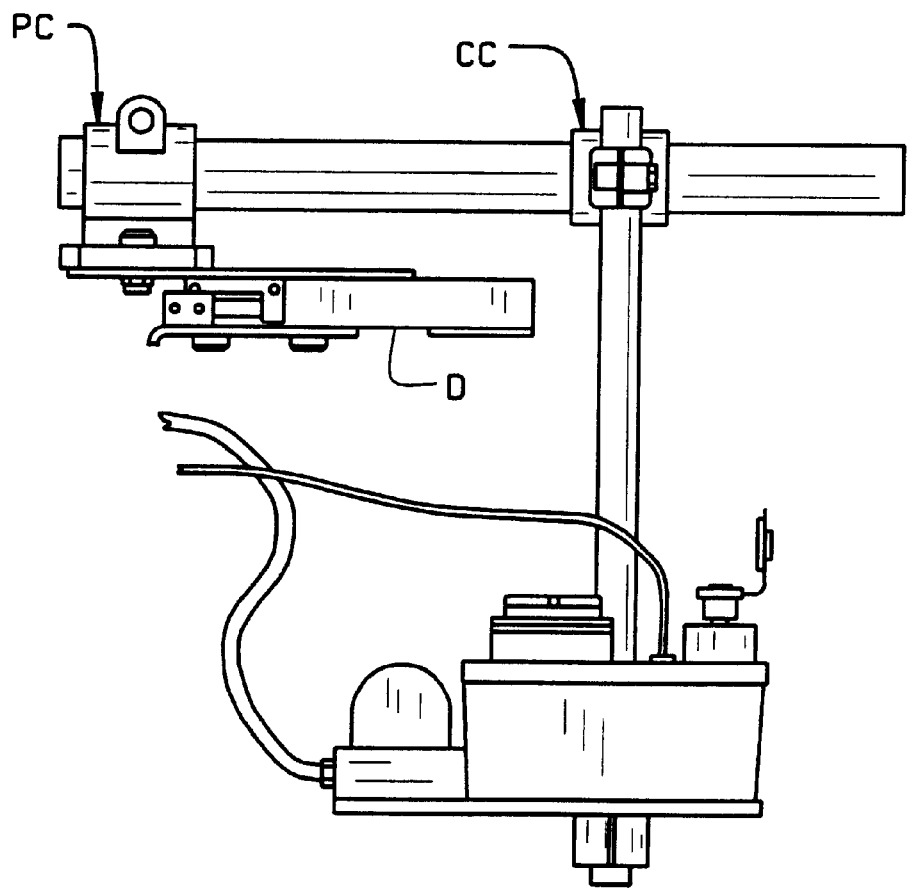
FIG. 11 is a perspective view of a print head mount using prior art parallel and cross-over clamps.

A clamp 1 of the present invention is shown generally in FIGS. 1–4. To overcome the problems with the prior art clamp of FIGS. 10 and 11, the clamp 1 is designed, as seen in FIGS. 7 and 8, so that the clamp 1 can be used to mount a structural member or tube T either parallel or perpendicular (normal) to a mounting surface. Additionally, the design, as discussed below, allows two clamps 1 to be secured together to mount two structural members in a cross-over relationship (i.e., generally about 90° relative to each other), or in a T-shaped relationship. Although the cross-over clamp is shown in the drawings to hold the structural members approximately 90° relative to each other, it will be understood that a cross-over clamp could hold the structural members together in other angular relationships. Thus, a single design of the present invention can be used to replace three different prior art clamps, and other possible combinations. This results in cost savings both in inventory and part cost. Additionally, it makes for a cleaner installation with common parts and increases functionality of those parts. This is important in a factory environment where downtime is expensive Although the clamp is described for use in association with structural members, and in particular round and square structural members, it will be apparent that the clamp can be used with longitudinally extending structural members in general, and the clamp can be configured to grip such structural members whether they be round, square, or any other polygonal shape in cross-section.

As best shown in FIGS. 1–4, the clamp I includes a base 3. The base 3 is shown to be generally square in plan view, but could be rectangular or other shapes as well. The base 3 includes a pair of openings or slots 5 which extend in from opposing sides 8 of the base, preferably in the center of the sides. The slots 5 extend through the full width of the base 3. Additionally, a pair of holes 7 located generally on the center of the plane of the clamp extend through the base 3. The holes 7 are spaced inwardly slightly from the sides 9 and are positioned about mid-way between the sides 8.

Figure 2:
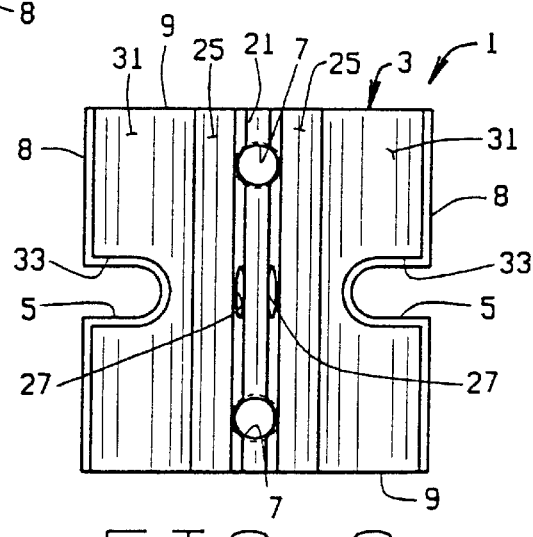
FIG. 2 is a top plan view of the clamp.

A pair of generally curved clamping arms 15 extend from the base 3. Preferably, the clamping arms 15 are integral with the base 3. The clamping arms 15 cooperate with each other to define a generally circular channel 17 which is open at its top 19. Thus, there is an opening 21 between the two clamping arms 15. The two clamping arms 15 extend between the base sides 9, such that the channel 17 is generally perpendicular to the base slots 5 and sides 9 and generally parallel to the base sides 8. The base holes 7 are centered with respect to the diameter of the channel 17, and thus are visible through the opening 21, as seen in FIG. 2. The clamping arms 15 each include a finger 25 which extends from the top of the channel 17. The fingers 25 have aligned holes 27 which receive a screw 29 as seen i n FIGS. 5 and 6. The channel 17 is formed with diameter slightly larger than the structural member T to allow the structural member T to be easily inserted in, and moved along, the channel 17. When the screw 29 is tightened, the fingers 25, and hence the clamping arms 15, will be pulled or drawn toward each other to frictionally grip the structural member T between the clamping arms 15 to secure the structural member T against movement relative to the clamp 1. To tighten the screw 29, one of the screw holes 27 can be threaded, as is shown in FIG. 6. Alternatively, a nut can be received on the end of the screw to tighten the screw. Further, the screw 29 can be provided with a handle to facilitate hand tightening of the screw.

Figure 3:
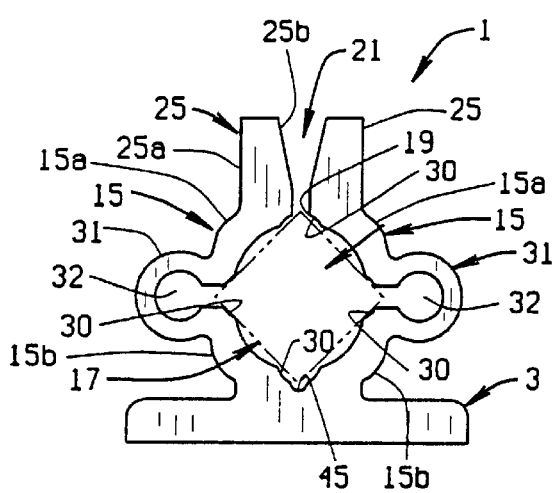
FIG. 3 is an end elevational view of the clamp, with a longitudinally extending structural member, exemplarily, square tubing, shown in phantom.

As best seen in FIG. 3, the channel 17 includes notches 30 which are spaced apart by about 90°. These notches allow for the channel to accept the corners of structural members which are square in cross-section (as shown in phantom in FIG. 3) as well as structural members which are circular in cross-section (as shown in FIG. 7). As can be appreciated, if square stock is used, the corners of the square member will be received in the notches 30. The advantage of using a square structural member is that when the clamp 1 is loosened, the square structural member will not rotate relative to the clamp 1. Thus, the rotational alignment of a print head or other equipment mounted to the structural member will not change, nor will bottle of ink mounted in an ink system on the structural member likely be tipped and spilled as they are repositioned.

Figure 4:
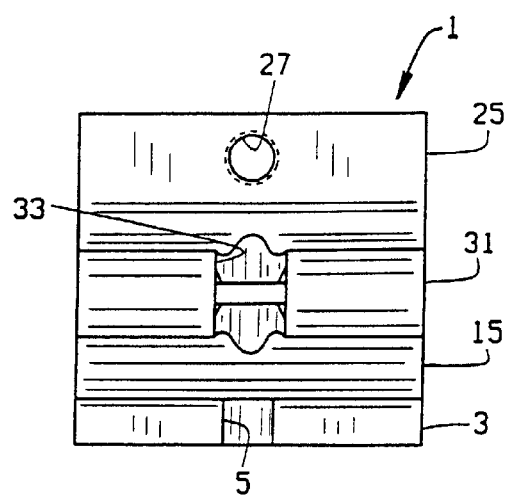
FIG. 4 is a side elevational view of the clamp.

Sleeves 31 extend along the clamping arms 15 and define generally cylindrical passages 32 which open up into the channel 17. As discussed below, the sleeves 31 accept a screw so that the clamp 1 can be used to mount structural member T to extend perpendicularly from a surface S (FIG. 8). The sleeves 31 extend out over the base 3. Thus, they cover the base slots 5. To provide access to the base slots 5, slots 33 are formed in the sleeves 31 above the base slots 5. As seen in FIGS. 2 and 4, the slots 33 in the sleeves 31 are aligned with, and slightly larger than, the bases slots 5.

It will also be appreciated that the sleeves 31 function as elastic hinges, which, upon tightening of the screw 29, allows the upper portions 15a of the clamping arms 15 to readily move relative to the lower portions 15b of the clamping arms while substantially reducing stress in the region where the clamping arms 15 join the base 3. It will also be appreciated that with such elastic hinges, upon tightening the screw 29, the upper portions 15a of the clamping arms 15 not only apply a clamping force on the structural member T, but also exert a downward force on the structural member T (as shown by the arrow in FIG. 3) so that the upper and lower portions of the structural member have substantially equal clamping forces applied thereto, even though the tightening screw 29 is located on the outer regions of the clamping arms. The flexible hinges defined by the sleeves 31 thus allow for four-point clamping on the structural member. Most conventional clamps, on the other hand, have only three-point clamping.

The clamp 1 is made from a suitable metal alloy. Preferably, the clamp is made from an aluminum alloy, such as 6061-T6. The clamp can be molded or preferably extruded from the alloy. The design of the clamp prevents the alloy from passing its yield point when the screw 29 is tightened to secure a structural member in the clamp. Thus, upon loosening the screw 29, the "memory" of the clamping arms 15 will cause the clamping arms 15 to elastically spring back away from the structural member so the structural member can be slid easily relative to the clamp 1 to reposition the structural member relative to the clamp. It will be appreciated that the elastic characteristics of the spring hinges defined by the sleeves 31 facilitate the clamping arms springing away from the structural member T when the screw 29 is loosened. The clamp 1 will not take a set after its first use, as occurs with the prior art clamps. Therefore, the clamping arms 15 will not have to be pried apart, nor will the structural member T have to be pounded or forced to move it to a new position relative to the clamp 1. Although the clamp is made of metal, any other material can be used which will not pass its yield point when the clamp is tightened, so that the clamping arms will not lose their "memory." For example, the clamp can be extruded or molded from a suitable plastic.

Figure 5:
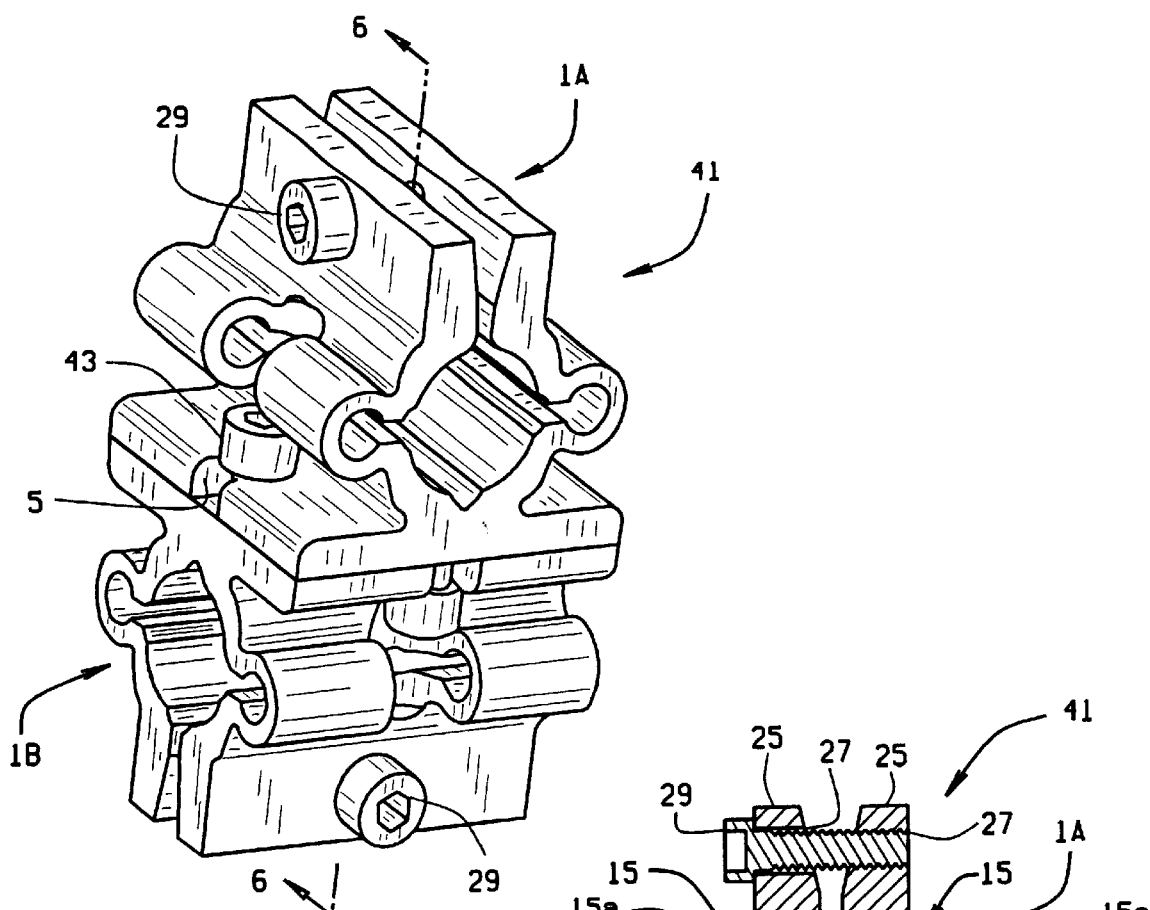
FIG. 5 is a perspective view of two clamps mounted together to form a cross-over clamp which will hold two structural members in a cross-over relationship.
Figure 6:
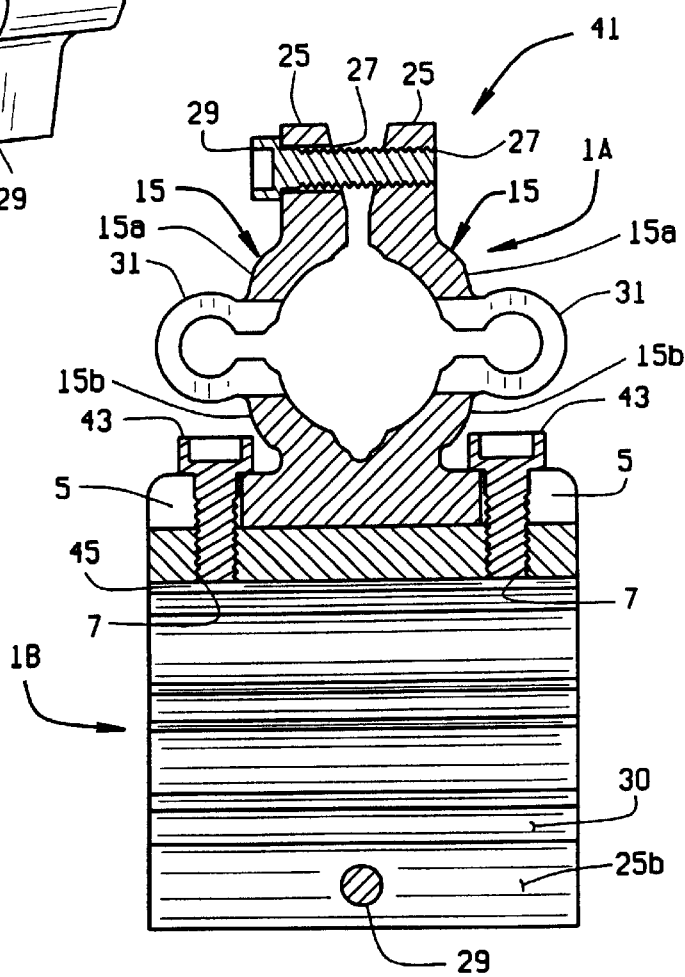
FIG. 6 is a cross-section taken along line 6—6 of FIG. 5.

The versatility of the clamp 1 is shown in FIGS. 5–9. As seen in FIGS. 5 and 6, two of the clamps 1A and 1B can be secured together to form a cross-over clamp 41. To secure the two clamps together a suitable fastener 43, such as a screw, is passed through the base slot 5 of clamp 1A into the hole 7 of clamp 1B. A small groove 45 is formed at the bottom of the structural member receiving channel 17, and the screw 43 extends to or slightly into the groove 45. Thus, the screw 43 will not extend into the channel 17, and the screw will not interfere with the passage of the structural member T through the channel 17. The hole 7 can be threaded, as shown in FIG. 6, so that the screw 43 can be screwed into the hole 7 to secure the two clamps together. Alternatively, the groove 45 can be sized to receive a nut which fits on the end of the screw. In either case, as noted, the channel 17 remains clear of obstructions so that the structural member T can easily slide through the channel 17.

In FIG. 7, a clamp 1 is mounted to a surface S to secure the structural member T in a parallel relationship to the surface S. To mount the clamp 1 to the surface S, fasteners 51 are passed through the base slots 5 into the surface S. The channel 17 extends generally parallel to the surface S so that the structural member T received in the clamp 1 will extend generally parallel to the surface S.

Figure 1:
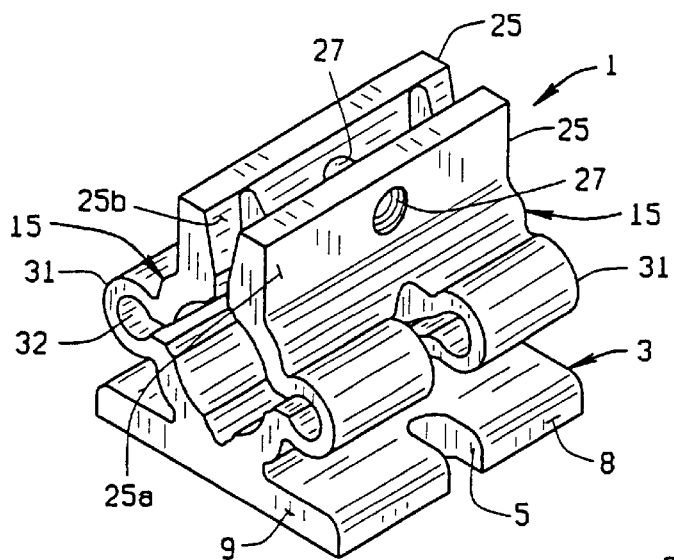
FIG. 1 is a perspective view of a clamp of the present invention.

In FIG. 8. a clamp 1 is shown mounted to a surface S so that the structural member T received in the clamp 1 will extend perpendicularly from (or normal to) the surface S. To mount the clamp 1 to the surface S, fasteners 61 are passed through the passages 32 defined by the sleeves 31 and into the surface S. The fasteners 61 are preferably sized so that they will not interfere with the elastic hinge characteristics of the sleeves 31. As can be appreciated, in this instance, the passages 32 define openings which receive the fasteners. Also, as seen in FIG. 1, for example, the openings defined by the passages 32 are angled relative to the openings or slots 5.

In both FIGS. 7 and 8, a cross-over clamp 41 (formed from two clamps 1) is mounted to the structural member T. A second structural member T2 is received in the cross-over clamp 41 so that the two structural members T and T2 can be mounted in a generally perpendicular relationship relative to each other. The ability to mount the second structural member T2 to the first structural member T, and the ability to easily position the structural members T and T2 relative to the clamps in which they are received allows for easy and accurate positioning of equipment (such as a print head or container of ink) at a desired position.

Figure 9:
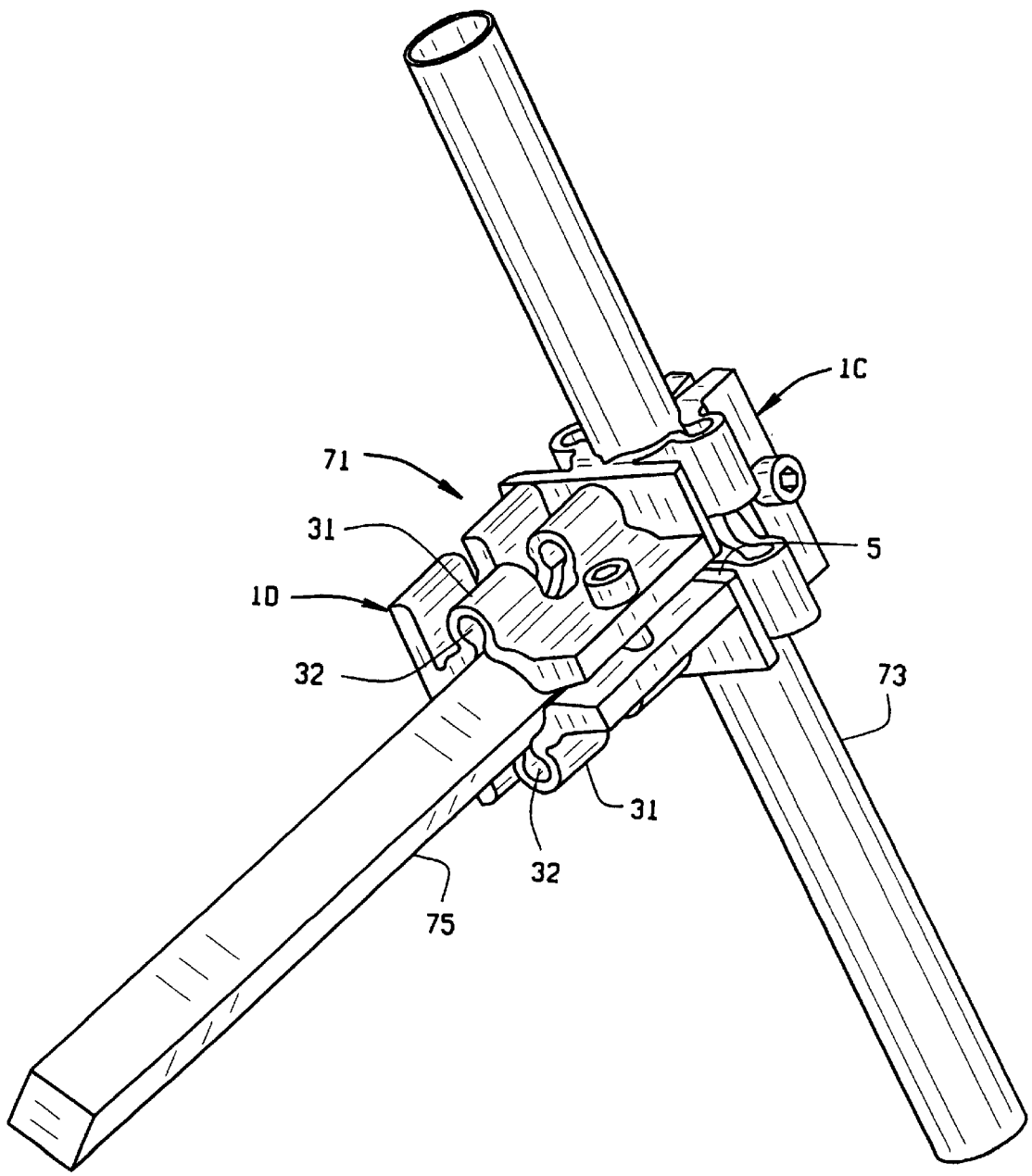
FIG. 9 is a perspective view of two clamps mounted together to form a T-clamp which will hold two structural members in a T-shaped relationship.

In FIG. 9, a pair of clamps 1C and 1D are connected together to form a T-clamp 71 which can be used to mount a first structural member 73 at an end of a second structural member 75 so that the two structural members define a "T". As can be seen in FIG. 9, structural member 73 is formed of round bar stock and structural member 75 is formed from square bar stock. Thus, the structural members which are connected together by the T-clamp (or the cross-over clamp) need not be of the same shape bar stock. To form the T-clamp 71, the clamp 1C is positioned against an end of the clamp 1D such that the slot 5 and screw holes 7 (not shown in FIG. 9) of the clamp 1C are aligned with the opening 21 and the sleeves 31 (and their passages 32), respectively, of the clamp 1D. A screw or other fastener, not shown, is passed through the sleeve passages 32 of the clamp 1D into the holes 7 of the clamp 1C. It will be appreciated that the T-clamp 71 could also be formed with the clamp 1C rotated 90° from the position shown in FIG. 9. In this instance, the slots 5 of the clamp 1C would be aligned with the sleeve passages 32 of the clamp 1D, and the fastener would be passed through the sleeve passage 32 into the slot 5 (or from the slot 5 through the passages 32). A nut, or similar securing member, would then need to be placed at the end of the fastener to secure the clamps 1C and 1D together in this relationship.

From the discussion of the cross-over clamp 41 and the T-clamp 71 it will be apparent that multiple clamps 1 can be combined together in multiple ways to connect structural members together in most any desired relationship. For example, a clamp can be added to one or both of the clamps 1A and 1B of the cross-over clamp 41 to form a combined cross-over and T-clamp. Additionally, the clamps 1A and 1B could be rotated 90° relative to each other so that the structural members can be mounted in a parallel relationship. Other combinations may be apparent to those skilled in the art.

In view of the above, it will be seen that the design of the clamp 1 allows for structural members to be mounted either parallel or perpendicular to a mounting surface, and when two clamps 1 are secured together, two structural members can be mounted in a cross-over relationship, a T-shaped relationship, or other desired relationships. Because only one clamp design is required, the design of a mounting system (to mount a component in desired location relative to a surface) is quickly and easily accomplished without significant down time. The ability to use one component for three or more different purposes also reduces the inventory requirements at the plant where the clamp will be used.

As various changes could be made in the above constrictions without departing from the scope of the invention, it is intended that all matter contained in the above description or shown in the accompanying drawings shall be interpreted as illustrative and not in a limiting sense. For example, the sleeves 31 which receive the fasteners 61 for perpendicularly mounting the clamp 1 to the surface could be positioned on the base 3 rather than along the clamping arms 15 so that the hinge point of the arms is at the bottom of the arms, rather than in the middle of the arms. Alternatively, the clamp base 3 or the clamping arms 15 could be made to be thicker (either in whole or in part), and the passages 62 could extend through the base or the clamping arms. The base slots 5 and/or the base holes 7 could be shaped (for example in an arc) so that the structural members T and T2 can be set to a desired angle, other than approximately 90°. These examples are merely illustrative.

What is claimed is:

1. A clamp for a longitudinally extending structural member; the clamp being capable of mounting the structural member parallel to, or perpendicular to, a mounting surface; the clamp comprising:

a base;

a pair of spaced apart clamping arms extending from the base; the clamping arms defining a channel sized to slidingly receive the longitudinally extending structural member, said channel having an axis generally parallel to a surface of said base;

an elastic hinge in at least one of said clamping arms;

a tightener which cooperates with the clamping arms to draw the clamping arms together so that the clamping arms frictionally grip the structural member to substantially prevent movement of the structural member relative to the clamping arms when the tightener is tightened; said at least one clamping arm elastically pivoting about said elastic hinge when said fastener is tightened, wherein, upon loosening of said tightener, said at least one clamping arm will elastically spring away from the structural member clamped in said clamp to allow said structural member to be repositioned relative to said clamp, or to be removed from said clamp;

an opening in the base through which a fastener can pass to mount said base to the mounting surface such that said channel axis is generally parallel to said mounting surface; and a passage extending generally parallel to the channel axis through which a fastener can extend to mount the clamp to the mounting surface such that said channel axis is generally perpendicular to the mounting surface.

2. The clamp of claim 1 wherein the passage extends through a sleeve formed on said clamp.

3. The clamp of claim 2 wherein said sleeve is adjacent at least one of said clamping arms.

4. The clamp of claim 3 wherein the sleeve is integral with said at least one of said clamping members.

5. The clamp of claim 1 wherein said opening in said base is a slot.

6. The clamp of claim 1 wherein two of said clamps can be joined together to hold two longitudinally extending structural members together in a desired relationship.

7. The clamp of claim 6 wherein each of said clamps includes a second opening in said base; whereby, when the base of a first clamp is placed adjacent the base of a second clamp, the base first opening of the first clamp will be aligned with the base second opening of the second clamp; said clamp including a fastener which extends through said first clamp base first opening and said second clamp base second opening to secure said first and second clamps together such that the axes of the channels of the respective clamps are angled with respect to one another, the clamps when so-connected defining a cross-over clamp which holds two structural members together in a cross-over relationship.

8. The clamp of claim 6 wherein each of said clamps includes a second opening in said base; whereby, when the base of a first clamp is placed adjacent an end of a second clamp, such that the passage of the second clamp is aligned with one of the openings in the first clamp base; said clamp including a fastener which extends through said second clamp passage and said first clamp base opening to secure said first and second clamps together such that the axes of the channels of the respective clamps are angled with respect to one another, the clamps when so-connected defining a T-clamp which holds two structural members together in a T-shaped relationship.

9. The clamp of claim 1 wherein said clamping arms have a memory, such that when the tightener is loosened, said clamping arms pull away from a structural member received in the channel so that said structural member will slide freely in said channel.

10. A clamp for a longitudinally extending structural member; the clamp being capable of mounting the structural member parallel to, or perpendicular to, a surface; the clamp comprising:

a base;

a pair of spaced apart clamping arms extending from the base; the clamping arms defining a channel sized to slidingly receive the longitudinally extending structural member, said channel having an axis generally parallel to a surface of said base;

a tightener which cooperates with the clamping arms to draw the clamping arms together so that the clamping arms frictionally grip the structural member to substantially prevent movement of the structural member relative to the clamping arms when the tightener is tightened;

an opening in the base through which a first fastener extends so that said base can be mounted to a mounting surface such that said channel axis is generally parallel to said mounting surface;

a passage extending through said sleeve and being generally parallel to the channel axis through which a second fastener can extend to mount the clamp to a mounting surface such that said channel axis is generally perpendicular to the mounting surface; said passage opening up into said channel;

a sleeve adjacent to at least one of said clamping arms; said sleeve defining an elastic hinge about which said at least one clamping arm elastically pivots when said fastener is tightened, wherein, upon loosening of said tightener, said at least one clamping arm will elastically spring away from the structural member clamped in said clamp to allow said structural member to be repositioned relative to said clamp, or to be removed from said clamp.

11. The clamp of claim 10 wherein said sleeve extends out over said base; said sleeve having a slot therein, said sleeve slot being aligned with said base opening to provide access to said base opening.

12. The clamp of claim 10 wherein said passage is generally circular in cross-section.

13. In a clamp for a longitudinally extending structural member, the clamp comprising a base and a clamping member on the base, the clamping member having an axis generally parallel to the base, the clamping member releasably frictionally engaging the longitudinally extending structural member to hold the structural member in the clamping member; the improvement comprising said clamp being adapted to be mounted to a surface such that the structural member extends parallel to, or perpendicularly to, said surface; and wherein a pair of said clamps can be joined together to secure two structural members together in a desired relationship; said clamp including a pair of opposed clamping arms defining a single channel sized to receive said structural member; an opening in the base adapted to receive a fastener to mount said base to a mounting surface such that said channel axis is generally parallel to said mounting surface; and a passage extending generally parallel to the channel axis and adapted to receive a fastener to mount the clamp to a mounting surface such that said channel axis is generally perpendicular to the mounting surface.

14. The improvement of claim 13 wherein said clamp includes a sleeve which defines said passage.

15. The improvement of claim 13 wherein said clamp is a unitary, one-piece clamp.

16. In a clamp for a longitudinally extending structural member, the clamp comprising a base and a clamping member on the base, the clamping member having an axis generally parallel to the base, the clamping member releasably frictionally engaging the longitudinally extending structural member to hold the structural member in the clamping member; the improvement comprising said clamp being adapted to be mounted to a surface such that the structural member extends parallel to, or perpendicularly to, said surface; and wherein a pair of said clamps can be joined together to secure two structural members together in a desired relationship;

said clamp including a sleeve formed on said clamping member; said sleeve defining a passage extending generally parallel to the clamping member axis; said passage being sized to receive a fastener which extends through said passage to mount said clamp to said surface such that said clamping member axis is generally perpendicular to said surface.

17. In a clamp for a longitudinally extending structural member, the clamp comprising a base and a clamping member on the base, the clamping member having an axis generally parallel to the base, the clamping member releasably frictionally engaging the longitudinally extending structural member to hold the structural member in the clamping member; the improvement comprising said clamp being adapted to be mounted to a surface such that the structural member extends parallel to, or perpendicularly to, said surface; and wherein a pair of said clamps can be joined together to secure two structural members together in a desired relationship;

said clamp including:
a first opening in said base; said first opening being sized to receive a fastener which extends through said base to mount said clamp to said surface such that said clamping member axis is generally parallel to said surface; and
a second opening extending through said base; said second opening being positioned, such that when the base of a first clamp is placed adjacent the base of a second clamp; said first opening of said first clamp base will be aligned with said second opening of said second clamp base;

said first and second clamps receiving a fastener which extends through said aligned first and second openings to secure said first and second clamps together, said first and second clamps, when so joined, forming a crossover clamp which can hold two structural members together in a cross-over relationship.

18. In a clamp for a longitudinally extending structural member, the clamp comprising a base and a clamping member on the base, the clamping member having an axis generally parallel to the base, the clamping member releasably frictionally engaging the longitudinally extending structural member to hold the structural member in the clamping member; the improvement comprising said clamp being adapted to be mounted to a surface such that the structural member extends parallel to, or perpendicularly to, said surface; and wherein a pair of said clamps can be joined together to secure two structural members together in a desired relationship;

said clamp including:
a passage extending generally parallel to the clamping member axis; said passage being sized to receive a fastener which extends through said passage to mount said clamp to said surface such that said clamping member axis is generally perpendicular to said surface; and
an opening extending through said base; said opening being positioned, such that when the base of a first clamp is placed adjacent an end of a second clamp; said opening of said first clamp base will be aligned with the passage of said second clamp base;

said first and second clamps receiving a fastener which extends through said aligned opening and passage to secure said first and second clamps together, said first and second clamps, when so joined, forming a T-clamp which can hold two structural members together in a T-shaped relationship.

* * * * *